May 17, 1966  A. WILHELM ETAL  3,251,293
FRYING APPARATUS
Filed March 16, 1964  8 Sheets-Sheet 3

ALFRED WILHELM
ALFRED LÖHR
INVENTORS.

May 17, 1966 A. WILHELM ETAL 3,251,293
FRYING APPARATUS
Filed March 16, 1964 8 Sheets-Sheet 4

ALFRED WILHELM
ALFRED LÖHR
INVENTORS.

BY

May 17, 1966 A. WILHELM ETAL 3,251,293
FRYING APPARATUS
Filed March 16, 1964 8 Sheets-Sheet 5

INVENTORS:
ALFRED WILHELM
ALFRED LÖHR
BY
AGENT

ALFRED WILHELM
ALFRED LÖHR
INVENTORS.

May 17, 1966  A. WILHELM ETAL  3,251,293
FRYING APPARATUS

Filed March 16, 1964  8 Sheets-Sheet 8

ALFRED WILHELM
ALFRED LÖHR
INVENTORS.

BY

AGENT

3,251,293
FRYING APPARATUS

Alfred Wilhelm, Essen-Bredeney, and Alfred Löhr, Bochum, Germany, assignors to F. Küppersbusch & Söhne, Aktiengesellschaft, Gelsenkirchen, Germany, a corporation of Germany
Filed Mar. 16, 1964, Ser. No. 352,376
Claims priority, application Germany, Mar. 14, 1963, K 49,190; Nov. 19, 1963, K 51,402; Dec. 12, 1963, K 51,602
19 Claims. (Cl. 99—409)

Our present invention relates to automatic devices for the frying of edible goods, such as meats.

An object of this invention is to provide an apparatus for the frying of meats and the like in a suitable medium, such as grease, oil or their own fat, in a manner substantially duplicating—although on a mass-production scale—the conditions of home frying in a pan, i.e. with intense heating of the goods first on one side and then on the other by radiation or contact with a hot plate, thereby catering to the tastes of those accustomed to this type of home cooking.

Another object of our invention is to provide an apparatus of this description which requires only a moderate amount of frying medium readily replenished to the extent of its depletion by the processing of the goods in assembly-line style, means being provided to prevent such medium from being wastefully splashed onto the machinery.

A further object of the instant invention is to provide, in apparatus of the type described, a transport system whose elements are continuously lubricated by the frying medium itself, thereby avoiding possible contamination of that medium by industrial lubricants.

It is also an object of this invention to provide an apparatus of the character set forth which can be easily serviced and cleaned, with only a brief interruption of its operation.

The foregoing objects are realized, in accordance with our invention, by the provision of an upper and a lower frying pan with sloping or curved, outwardly ascending guide plates merging with the pan bottom at opposite ends, in combination with a looped conveyor forming a generally horizontal upper run above the bottom of the upper pan and a similar lower run above the bottom of the lower pan, the conveyor including a series of longitudinally spaced, preferably blade-shaped elements serving to entrain the goods to be fried, in succession, through the two pans and through an intervening guide channel adapted to invert these goods on their passage from one pan to the other so that the goods are about uniformly roasted by suitable heating means while passing through these pans. Naturally, the heating means of one pan could be deactivated if, for any reason, the goods are to be fried on one side only.

The blade-shaped entraining elements, which move close to the pan bottoms and to the curved or inclined inlet and outlet plates of the pans, form links that bridge two endless members such as a pair of parallel chains passing around two sprocket wheels (one or both of which may be driven) at the ends of the loop. Guide rollers, advantageously constituted by the outer races of annular antifriction (roller or ball) bearings, bear upon these chains at the inlet end of one—preferably the upper—pan and at the outlet end of the other pan as a means for feeding the goods to the conveyor system and subsequently discharging them therefrom; similar rollers may also be disposed at the opposite pan ends whereby the entraining blades are maintained close to the pan bottom at the locations where it merges with the respective guide plates. In some instances, particularly with relatively shallow pans having low side walls parallel to the direction of conveyor motion, the chains may be disposed outside the pans in such manner that the blades sweep substantially the entire width of the pane; in other instances it will be more convenient to have the chains run inside the pans close to the upstanding side walls, with the added advantage that these chains are continuously lubricated by the frying medium within the pans and, in removing a small part of this medium, create an outward flow thereof which tends to carry off impurities. Fresh frying medium such as hot fat may be supplied, continuously or intermittently, through suitable sprinklers disposed above the pans, particularly in the region near their inlet ends. Any grease adhering to the conveyor will, of course, be prevented from hardening thereon by being dipped again into the hot fluid within the pans.

In principle, the heating of the goods traveling inside the pans may be carried out with a variety of means known per se, including gas or oil flames or electric energy, by thermal convection and/or radiation. Advantageously, several heaters or groups of heaters associated with each pan may be individually controlled to permit a selective variation of the treatment temperature along the path of the goods. The speed of the conveyor drive may also be made adjustable, either continuously or in steps.

To facilitate cleaning and servicing of the two superposed pans, we provide in accordance with a further feature of this invention for a tiltability of the upper pan, preferably about an axis parallel to one of its longitudinal sides and, therefore, to the direction of conveyor motion. For this purpose we propose to divide the machine frame into a fixed lower portion, supporting the lower pan, and a swingable upper portion hinged to the lower portion, this upper portion carrying both the upper pan and the conveyor system. The tilting of the upper portion from its normal, operative position above the lower pan may be effected in various ways, advantageously by a temporary coupling of a lifting mechanism with the conveyor drive.

The above and other features of our invention will become more fully apparent from the following detailed description of certain embodiments, reference being made to the accompanying drawing in which.

Figure 1:
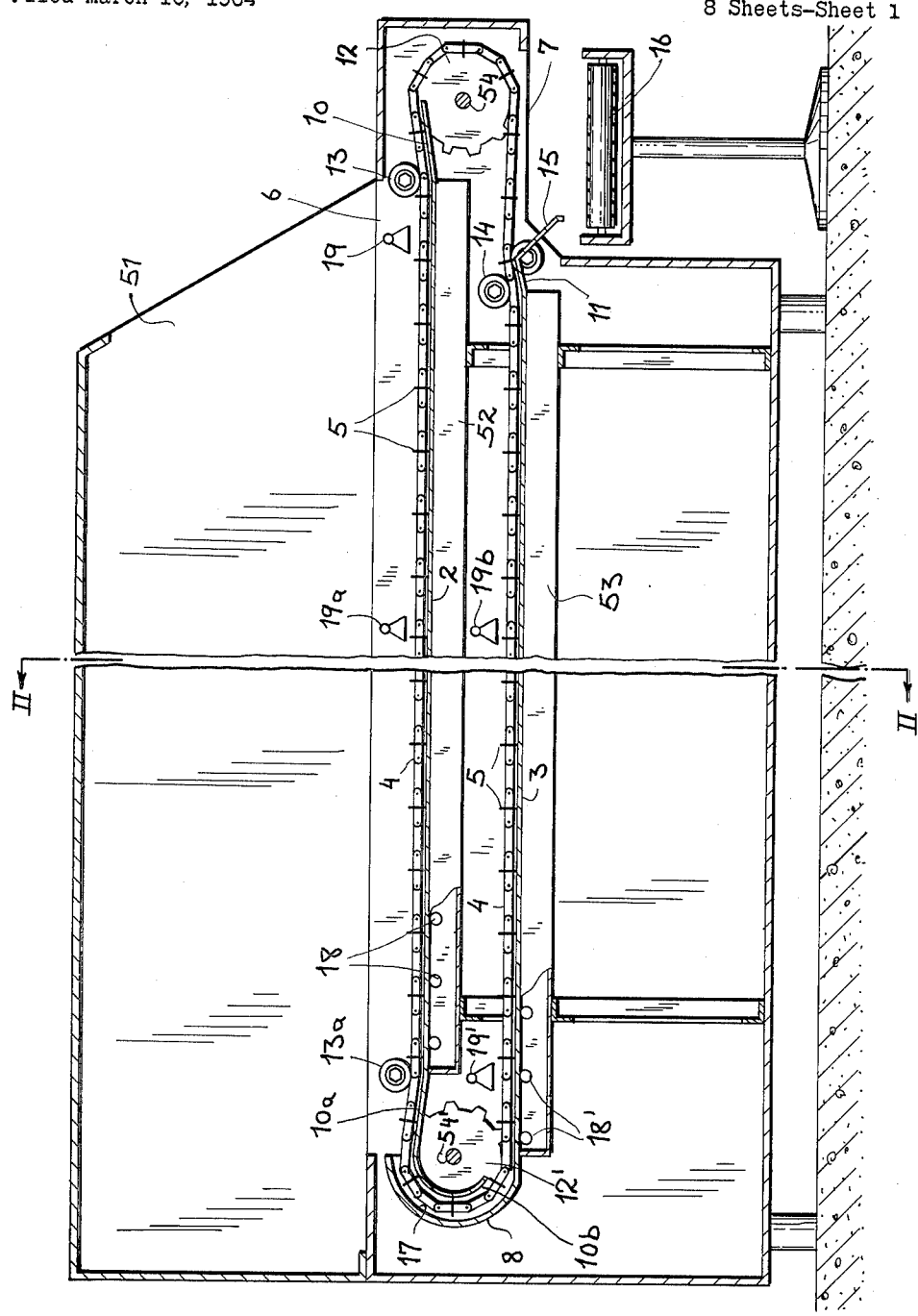
FIG. 1 is a longitudinal sectional view of a frying apparatus embodying the invention.
Figure 2:
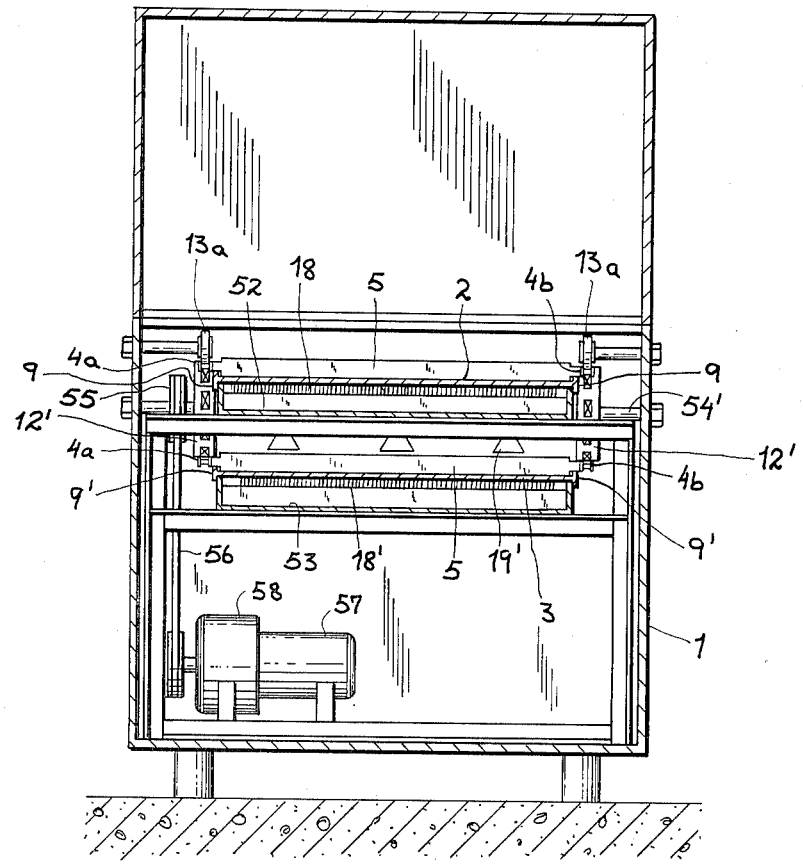
FIG. 2 is a cross-sectional view taken on the line II—II of FIG. 1.

The automatic frying machine shown in FIGS. 1 and 2 comprises a frame 1 with a removable lid 51, this frame supporting two shallow pans 2 and 3 fixedly positioned one above the other. The upper pan 2 has an inlet end defined by a downwardly sloping guide plate 10 and a guide roller 13 above that plate near its junction with the pan bottom; the opposite outlet end of this pan is similarly defined by an inclined guide plate 10a and a guide roller 13a. The lower pan 3 has an outlet end defined in analogous manner by an upwardly sloping guide plate 11, in the general region of plate 10, whereas the opposite inlet end of pan 3 is defined by an approximately semicylindrically curved apron 8 merging with the bottom of that pan. A guide roller 14, similar to rollers 13 and 13a, is disposed above the junction of the bottom of pan 3 with plate 11 which terminates in a downwardly sloping chute 15 leading to a cross-conveyor 16.

The longitudinal walls 9, 9' of pan 2 and 3 rise only slightly above the pan bottom, to approximately the level defined by the outer ends of guide plates 10, 10a and 11, so that these pans are relatively shallow. The elongated rectangular shape of the pans 2 and 3 will best be apparent from a top view of a similar pan 202 in FIG. 7 discussed hereinafter. Fixedly positioned directly below these pans are a pair of box-shaped housings 52, 53 which extend over substantially the entire length and width thereof and form enclosures for electric heating elements 18 and 18', respectively. A sprinkler 19 at the feeding end for the goods to be fried, i.e. in the vicinity of guide plate 10 and roller 13, and at least one other sprinkler 19a further along the path of the goods serve to admit a liquid frying medium such as hot fat to the pans; a similar sprinkler 19' at the inlet end of pan 3, i.e. near the curved guide plate 8, and one or more additional sprinklers 19b closer to the discharge end 7 are provided for the same purpose at the lower level.

The transportation of the goods from the feeding end 6 to the discharge end 7, i.e. to the cross-conveyor 16, proceeds with the aid of a principal conveyor composed of two endless chains 4a, 4b which are interconnected by longitudinally spaced transverse blades 5. The chains 4a, 4b are looped around two pairs of sprocket wheels 12, 12' mounted on respective shafts 54, 54'. As shown in FIG. 2, sprocket shaft 54' also has keyed to it a pulley 55 which is driven via a belt 56 from a motor 57, thus imparting rotation to the conveyor system in the counterclockwise direction indicated by the arrows in FIG. 1. A speed changer 58 associated with motor 57 serves to adapt the rate of conveyor motion to specific requirements.

The cylindrically curved guide plate 8 is centered on the shaft 54' and, together with a coaxially curved extension 10b of plate 10a, defines a guide channel for the inversion of goods passing from the upper pan 2 onto the lower pan 3. The sprockets 12, 12' are so disposed in relation to the two pans that the chains 4a and 4b, guided additionally by the idler rollers 13, 13a and 14, lie just above the level of the side walls 9, 9' in order that the reduced extremities of blades 5, linked to these chains, will just clear these side walls as the blades sweep closely above the pan bottom.

In operation, the goods to be fried are delivered automatically or by hand to the inlet plate 10 at the feeding end 6 where they are received between a pair of sucessive blades 5 and entrained along upper pan 2 for heating by the elements 18; upon passing through the inversion channel 17, they travel toward the discharge end 7 along the lower pan 3 where their remaining surfaces are heated by the elements 18'. Naturally, the inversion channel 17 could be replaced by an arrangement similar to that shown at the discharge end 7, with omission of the lower pan 3, if only the lower surfaces of the goods are to be exposed to direct heating. The same effect, with the system illustrated in FIGS. 1 and 2, will be had if either the heating elements 18 or the heating elements 18' are selectively disconnected.

Figure 3:
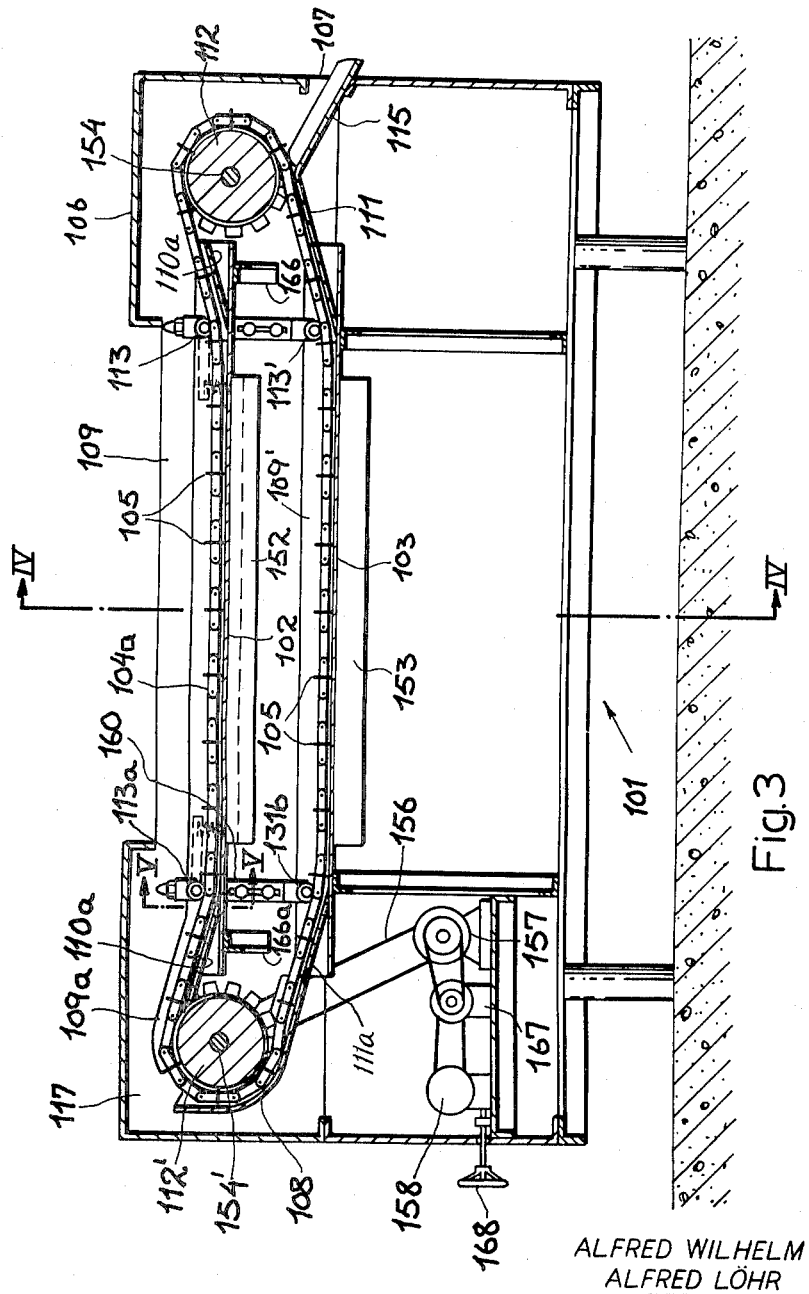
FIG. 3 is a view similar to FIG. 1, showing a different embodiment.
Figure 4:
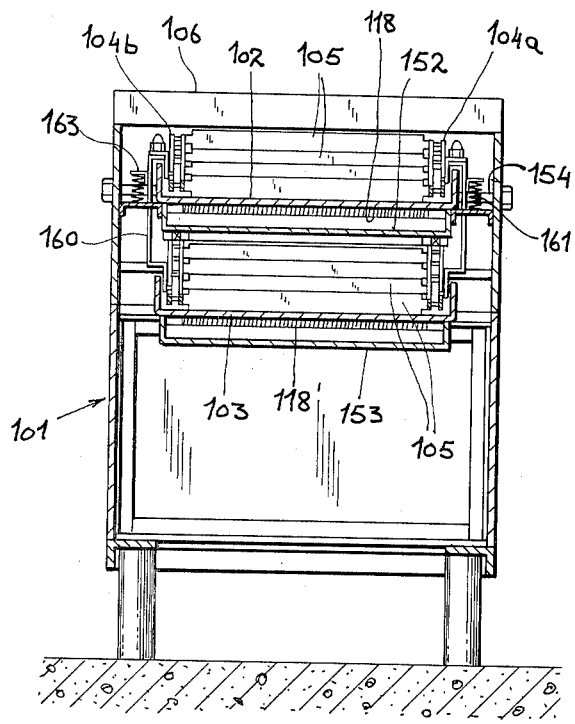
FIG. 4 is a cross-sectional view, similar to FIG. 2, of the embodiment shown in FIG. 3.
Figure 5:
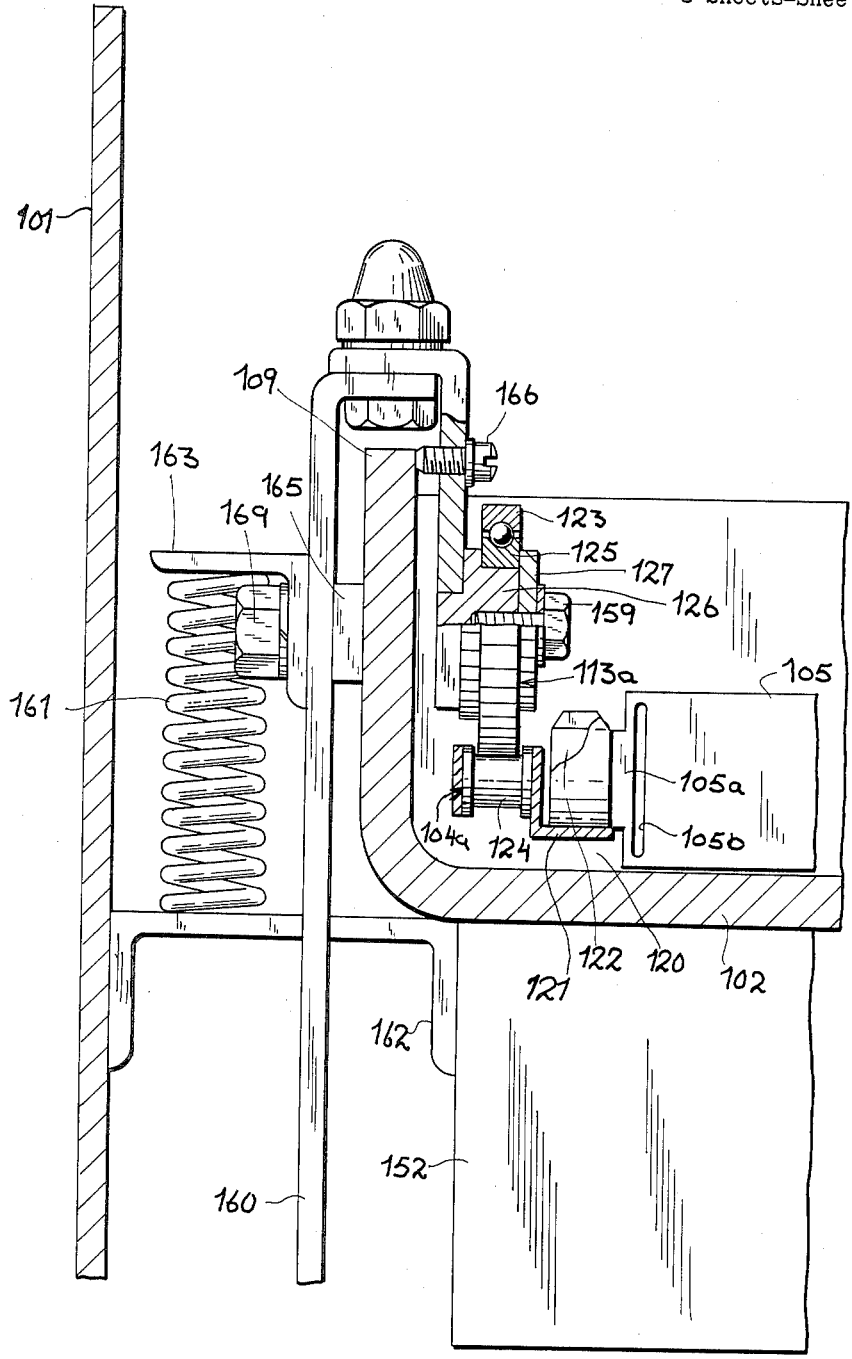
FIG. 5 is a sectional detail view, drawn to a larger scale, taken on the line V—V of FIG. 3.

In FIGS. 3–5 we have indicated by like reference numerals, preceded by a "1" in the position of the hundreds digit, elements similar or equivalent to those described in conjunction with FIGS. 1 and 2. The pans 102 and 103 in this embodiment are deeper than in the preceding case, with the result that the sprocket chains 104a, 104b can no longer be disposed outside the pans but are located inside the latter next to the walls 109, 109'. The pair of chain-engaging sprockets on the side of inversion channel 117 are constituted by peripheral teeth on a roller 112' whose surface forms part of this channel, the apron 108 being curved along a lower quadrant of this roller and merging with a sloping guide plate 111a at the inlet end of lower pan 103. The corresponding guide plate 110a of pan 102 is tangent to the roller surface and is flanked by extensions 109a of side walls 109. At the other end of the looped conveyor 104a, 104b, 105, i.e. in the region of the feeding and discharge ends 106 and 107, a similar roller 112 on shaft 154 bears sprocket teeth in engagement with the two chains. A further guide roller 113b overlies each chain in the region where plate 111a merges with the bottom of pan 103.

The mounting of the pairs of guide rollers 113, 113', 113a, 113b is best illustrated in FIG. 5 with particular reference to one roller 113a which is representative of all four pairs. This roller is, in effect, an idler ring constituted by the outer race 123 of an annular ball bearing whose inner race 125 is seated on a stub shaft with the aid of a retaining disk 127 and a screw 159. Stub shaft 126 is rigid with a bar 160, of inverted-J shape, whose lower end (not shown in FIG. 5) similarly supports the roller 113b. Bar 160 is resiliently supported, with reference to the machine frame 101, on a compression spring 161 which rests on a bracket 162 rigid with housing 152 and which bears upon a bracket 163 fastened onto bar 160 by means of a bolt 164. This bolt also engages a spacer 165, which, together with a screw 166, serves to maintain the proper relative position between the pan wall 109 and the bar 160 with its roller 113a. The pan 102 itself, together with the housing 152 attached to its underside, is carried by brackets 166, 166a (FIG. 3) secured to the frame 101.

FIG. 5 also illustrates the manner in which the rollers 113a etc. co-operate with the chains 104a, 104b, as well as the type of connection preferentially employed between the chains and the transverse blades 105. Roller 113a is seen to engage in a recess of chain link 124, this link being rigid with a bracket 121 having a pair of spring fingers 122 rising therefrom. The reduced extremity 105a of blade 105 is resiliently gripped between the spring fingers 122 so as to be securely clamped therein for travel either in the position shown in FIG. 5, along the upper run of the conveyor, or in an inverted position along the lower run thereof. A slot 105b between the body of the blade and its clamped extremity reduces heat transfer to the chain 104a a similar slot being of course provided on the opposite side of the blade.

The operation of the system shown in FIGS. 3–5 is generally similar to that of the apparatus shown in FIGS. 1 and 2 and need not to be described in detail. The drive motor 157 of this system is coupled via an intermediate transmission 167 with the speed changer 158 which is adjustable by a hand wheel 168, the relative arrangement of these parts being more clearly ascertainable from the top view of FIG. 7 in which the corresponding reference numerals have been altered by the substitution of a "2" for a "1" in the position of the hundreds digit.

Figure 6:
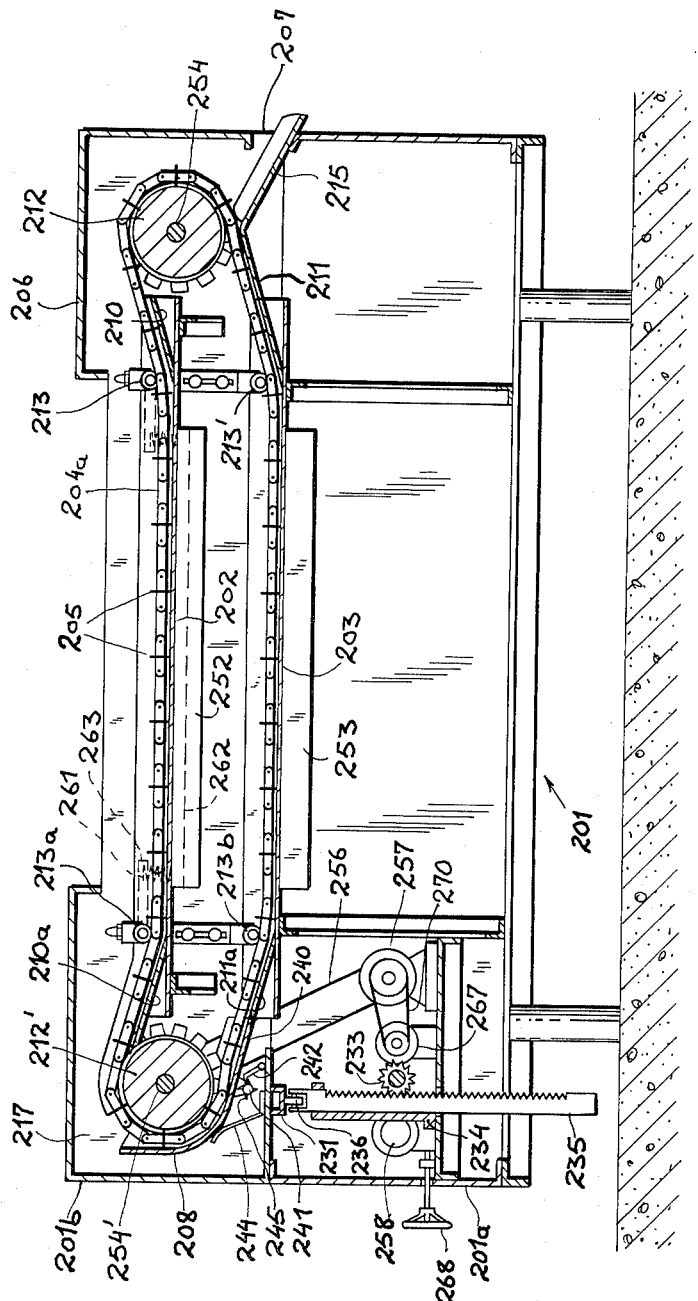
FIG. 6 is another view similar to FIG. 1, illustrating a modification of the apparatus of FIGS. 3–5.
Figure 7:
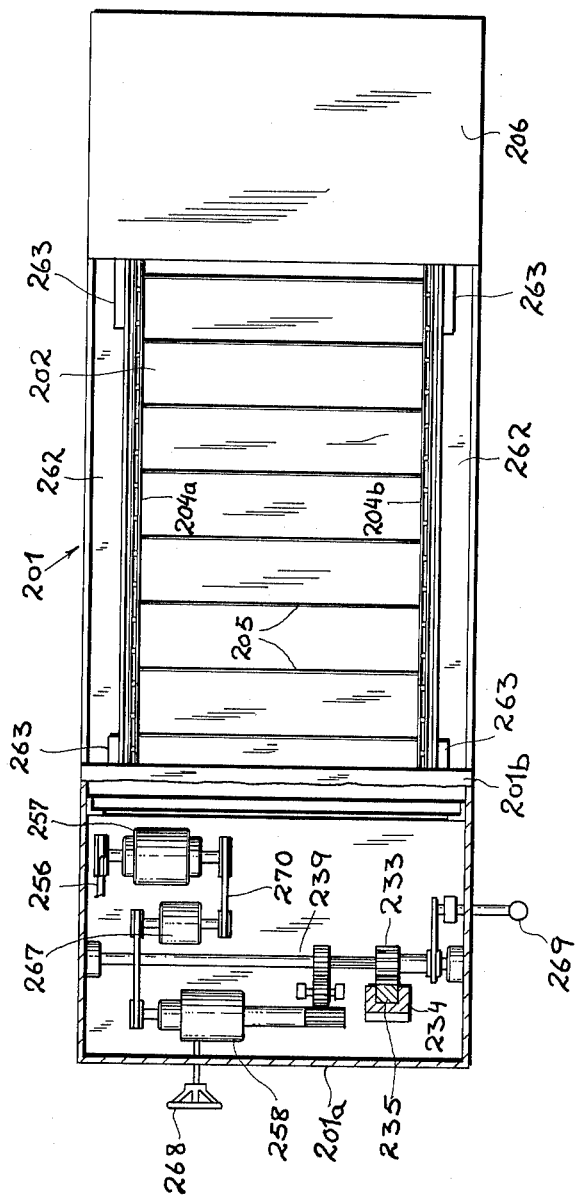
FIG. 7 is a top view of the apparatus shown in FIG. 6.
Figure 8:
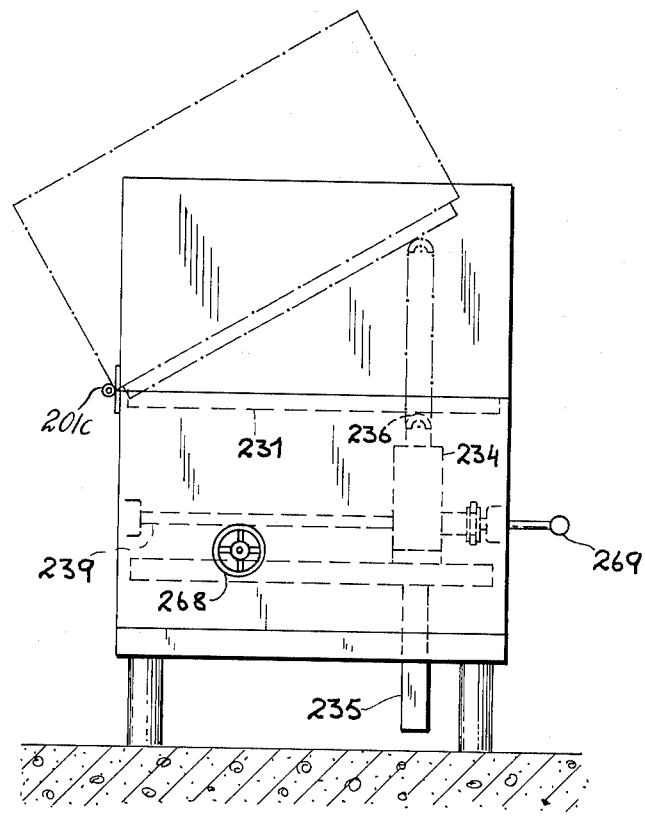
FIG. 8 is an end view of the apparatus illustrated in FIGS. 6 and 7.

The embodiment of FIGS. 6–8 differs from that of FIGS. 3–5 only by the provision of means for tilting the assembly of sprocket cylinders 212, 212' and conveyor 204a, 204b, 205, together with the upper pan 202, upwardly about a horizontal axis parallel to the longitudinal pan edges in order to give access to the lower pan 203 and other parts of the machinery. To this end, frame 201 divided into a stationary lower portion 201a and a swingable upper portion 201b hinged to the lower portion at 201c so as to be tiltable into the position illustrated in dotdash lines in FIG. 8. A brace 231 spans the bottom of upper frame portion 201b and overlies an upright rack 235 frictionally guided in a vertical channel 234, offset from the hinge axis, this rack carrying at its upper end a roller 236 which rides on the underside of brace 231 when the rack is lifted to tilt the frame portion 201b. A pinion 233, normally disconnected from rack 235, is shiftable with the aid of a handle 269 into engagement with this rack, this pinion being keyed to a shaft 239 driven from the motor 257 through the intermediary of a belt 270.

The inclined guide plate 211a at the inlet end of pan 203 is here separate from the curved guide plate 208 whose lower extension 240 overlies the plate 211a in the normal operative position of the assembly shown in FIG. 6. The guide member 208, 240 is pivoted to the frame portion 201b at 241, a spring 244 fastened to brace 231 bearing from below upon the plate 208 so as to swing this guide member clockwise whereby extension 240 comes to rest upon plate 211a. A detent 242, in the form of a pawl engageable with a ratchet 245 on the pivot pin 241, normally holds the guide members 208, 240, 211a in their co-operating position.

It will be evident that compatible features from the several disclosed embodiments may be combined or interchanged and that various other modifications of the arrangements described and illustrated, readily apparent to persons skilled in the art, may be made without departing from the spirit and scope of our invention as defined in the appended claims.

We claim:
1. A frying apparatus comprising an upper pan, a lower pan underneath said upper pan, said pans having inlet and outlet ends each provided with an outwardly ascending guide plate forming an extension of the pan bottom, looped conveyor means forming a substantially horizontal upper run above the bottom of said upper pan and a substantially horizontal lower run above the bottom of said lower pan, curved guide means at one end of said conveyor means forming a channel for the inversion of unilaterally fried goods upon passage from one pan to the other, said conveyor means including a series of longitudinally spaced elements passing closely above the bottoms of said pans and above said guide plates for the entrainment of said goods, heating means for said goods adjacent said conveyor means in the region of each of said pans, and drive means for operating said conveyor means.

2. An apparatus as defined in claim 1, further comprising nozzle means above said pans for supplying frying medium to said goods.

3. An apparatus as defined in claim 1 wherein said pans are of generally rectangular shape and provided with upstanding walls along the sides parallel to the direction of motion of said conveyor means, the latter including a pair of endless members passing within said pans along said walls thereof and bridged by said spaced elements.

4. An apparatus as defined in claim 3 wherein said endless members are sprocket chains having links provided with inwardly directed brackets supporting said elements.

5. An apparatus as defined in claim 4 wherein said elements are blade-shaped, said brackets being provided with pairs of spring fingers clamping the ends of said elements between them.

6. An apparatus as defined in claim 1 wherein said curved guide means comprises a deflecting roller for said conveyor means and an apron substantially coaxially curved about at least a lower part of said roller.

7. A frying apparatus comprising an upper pan, a lower pan underneath said upper pan, said pans having inlet and outlet ends each provided with an outwardly ascending guide plate forming an extension of the pan bottom, looped conveyor means forming a substantially horizontal upper run above the bottom of said upper pan and a substantially horizontal lower run above the bottom of said lower pan, curved guide means at the descending side of said conveyor means forming a channel for the inversion of unilaterally fried goods upon passage from said upper pan to said lower pan, said conveyor means including a series of longitudinally spaced elements passing closely above the bottoms of said pans and above said guide plates for the entrainment of said goods, feed means for said goods at the inlet end of said upper pan, discharge means for said goods at the outlet end of said lower pan, heating means for said goods adjacent said conveyor means in the region of each of said pans, and drive means for operating said conveyor means.

8. An apparatus as defined in claim 7 wherein said feed means and said discharge means include respective guide rollers bearing upon said conveyor means from above.

9. An apparatus as defined in claim 8 wherein said conveyor means includes a pair of endless parallel members interconnected by said spaced elements, said guide rollers comprising idler rings overlying said members and stub shafts rotatably supporting said rings by antifriction bearing means.

10. An apparatus as defined in claim 7 wherein said discharge means includes a chute forming an extension of the guide plate at the outlet end of said lower pan.

11. An apparatus as defined in claim 10 wherein said discharge means further includes a cross-conveyor at the delivery end of said chute.

12. A frying apparatus comprising a frame, an elongated upper pan upwardly tiltable on said frame from a normal horizontal position about an axis parallel to one of its longitudinal sides, an elongated lower pan underneath said upper pan accessible from above upon tilting of the latter having inlet and outlet ends each provided with an outwardly ascending guide plate forming an extension of the pan bottom, looped conveyor means forming a substantially horizontal upper run above the bottom of said upper pan and a substantially horizontal lower run above the bottom of said lower pan, curved guide means at one end of said conveyor means forming a channel for the inversion of unilaterally fried goods upon passage from one pan to the other, said conveyor means including a series of longitudinally spaced elements passing closely above the bottoms of said pans and above said guide plates for the entrainment of said goods, heating means for said goods adjacent said conveyor means in the region of each of said pans, and drive means for operating said conveyor means.

13. An apparatus as defined in claim 12 wherein said frame comprises a stationary lower portion supporting said lower pan and an upper portion supporting said upper pan along with said conveyor means, said upper portion being hingedly connected with said lower portion for upward tilting together with said upper pan and conveyor means.

14. An apparatus as defined in claim 13 wherein said lower portion is provided with lifting means offset from the hinge axis for raising said upper portion into a tilted position.

15. An apparatus as defined in claim 14 wherein said lifting means includes a frictionally guided upright rack and a pinion selectively operable to raise said rack, said upper portion being provided with abutment means engageable from below by the top of said rack.

16. An apparatus as defined in claim 15 wherein said drive means is mounted on said lower portion adjacent said lifting means, further comprising coupling means operable to connect said pinion with said drive means for elevating said rack.

17. A frying apparatus comprising a frame with a stationary lower portion, an upper portion hingedly secured to said lower portion for upward tilting from a normal position, an upper pan horizontally supported on said upper portion in said normal position thereof, a lower pan horizontally supported on said lower portion underneath said upper pan and accessible from above upon a tilting of said upper portion and pan, said pans having inlet and outlet ends each provided with an outwardly ascending guide plate forming an extension of the pan bottom, looped conveyor means on said upper portion forming a substantially horizontal upper run above the bottom of said upper pan and a substantially horizontal lower run above the bottom of said lower pan, curved guide means at the descending side of said conveyor means forming a channel for the inversion of unilaterally fried goods upon passage from said upper pan to said lower pan, said conveyor means including a series of longitudinally spaced elements passing closely above the bottoms of said pans and above said guide plates for the entrainment of said goods, feed means for said goods at the inlet end of said upper pan, discharge means for said goods at the outlet end of said lower pan, heating means for said goods adjacent said conveyor means in the region of each of said pans, and drive means for operating said conveyor means.

18. An apparatus as defined in claim 17 wherein said curved guide means comprises an apron normally forming a sloping extension of the guide plate at the inlet of the lower pan and partly overlying same, said apron being liftable off the last-mentioned guide plate upon an upward tilting of said upper portion.

19. An apparatus as defined in claim 18 wherein said apron is pivotally supported on said upper portion and provided with resilient means normally biasing said apron into contact with the associated guide plate, further comprising detent means operable to lock said apron in contact with said associated guide plate.

References Cited by the Examiner
UNITED STATES PATENTS

| | | | |
|---|---|---|---|
| 1,234,131 | 7/1917 | Cleveland | 99—404 |
| 1,855,540 | 4/1932 | Baker et al. | 99—404 |
| 2,319,561 | 5/1943 | Scharsch | 99—404 |

WALTER A. SCHEEL, *Primary Examiner.*

ROBERT W. JENKINS, *Assistant Examiner.*